US006815997B2

(12) United States Patent
Dathe et al.

(10) Patent No.: US 6,815,997 B2
(45) Date of Patent: Nov. 9, 2004

(54) FIELD EFFECT TRANSISTOR SQUARE MULTIPLIER

(76) Inventors: Lutz Dathe, Selliner Strasse 30, 01109 Dresden (DE); Wolfram Kluge, Darwinstr. 10, 01109 Dresden (DE)

( * ) Notice: Subject to any disclaimer, the term of this patent is extended or adjusted under 35 U.S.C. 154(b) by 541 days.

(21) Appl. No.: 09/829,160

(22) Filed: Apr. 9, 2001

(65) Prior Publication Data

US 2002/0070789 A1 Jun. 13, 2002

(30) Foreign Application Priority Data

Dec. 7, 2000 (DE) ........................................ 100 60 874

(51) Int. Cl.[7] .............................. G06F 7/44; G06G 7/16
(52) U.S. Cl. ........................ 327/356; 327/349; 327/359
(58) Field of Search ................................ 327/351, 352, 327/355, 356, 359, 361, 349

(56) References Cited

U.S. PATENT DOCUMENTS

| | | | | |
|---|---|---|---|---|
| 5,521,542 A | * 5/1996 | Kimura | ...................... | 327/352 |
| 5,581,211 A | * 12/1996 | Kimura | ...................... | 327/356 |
| 5,617,052 A | * 4/1997 | Kimura | ...................... | 327/356 |
| 5,631,594 A | * 5/1997 | Kimura | ...................... | 327/351 |

OTHER PUBLICATIONS

"An MOS Four–Quadrant Analog Multiplier Using Simple Two–Input Squaring Circuits with Source Followers" by Ho–Jun Song and Choong–Ki Kim, Published in IEEE Journal of Solid–State Circuits, vol. 25, No. 3 Jun. 1990.

"A Four–Quandrant CMOS Analog Multiplier for Analog Neural Networks" by N. Saxena and J. J. Clark, Published in IEEE Journal of Solid–State Circuits, vol. 29, No. 6, Jun. 1994.

"A CMOS Four–Quadrant Analog Multiplier with Single–Ended Voltage Output and Improved Temperature Performance" by Z. Wang, Published in IEEE Journal of Solid–State Circuits, vol. 26, No. 9, Sep. 1991.

* cited by examiner

*Primary Examiner*—Terry D. Cunningham
*Assistant Examiner*—Long Nguyen
(74) *Attorney, Agent, or Firm*—Williams, Morgan & Amerson, P.C.

(57) ABSTRACT

A FET square multiplier is disclosed that transforms an input signal into two currents $I_1$ and $I_2$, the difference of which is proportional to the square of the input signal. A first and a second FET are connected at their drains and are source-coupled to the source of a third FET whose transconductance is twice the transconductance of the first and the second FET. The common source node is biased by a constant current source. The FETs are operated in the saturation region to exploit the square dependency of the drain current on the difference of the gate-source voltage and the treshold voltage of an FET.

16 Claims, 2 Drawing Sheets

FIELD EFFECT TRANSISTOR SQUARE MULTIPLIER

BACKGROUND OF THE INVENTION

1. Field of the Invention

The present invention relates to the field of analog signal processing, and in particular to squaring an input signal by using field effect transistors operated in the saturation region to obtain an output signal that is proportional to the square of the input signal.

2. Description of the Related Art

In the field of analog signal processing very often a square output of an input signal is required. Since field effect transistors provide a plurality of advantages over bipolar transistors, for example, with respect to power consumption, a great deal of effort has been made in developing analog circuits that include squaring circuitry using field effect transistors instead of bipolar transistors. In most of these analog circuits, such as in four-quadrant multipliers, for a squaring stage of the circuit, the square relationship of the drain current $I_{DS}$ with respect to the difference of the gate-source voltage $V_{GS}$ and the threshold voltage of a field effect transistor $V_{Th}$ is employed when operated in the saturation region. The saturation region of a field effect transistor is defined as the region in which the voltage applied to the drain-source terminals $V_{DS}$ is higher than the difference of $V_{GS}$ and $V_{Th}$. In this operation mode, the drain current is given by the following equation:

$$I_{DS}=K\ (V_{GS}-V_{Th})^2,$$

where $K=\frac{1}{2}\mu_0 C_{OX}(W/L)$ is the transconductance parameter, wherein $\mu_0$ is the effective surface mobility, $C_{OX}$ is the gate capacitance per unit area and W/L is the aspect ratio of the transistor channel width W and the transistor channel length L. Despite this inherent square relationship between the drain-source current and the gate-source voltage, it is nevertheless difficult to realize a simple and efficient circuit providing a pure square output signal, wherein variation of transistor characteristics does not adversely affect operation of the circuit.

The document "An MOS Four-Quadrant Analog Multiplier Using Simple Two-Input Squaring Circuits with Source Followers" by Ho-Jun Song and Choong-Ki Kim, published in IEEE Journal of Solid-State Circuits, Vol. 25, No. 3, June 1990, describes a four-quadrant multiplier based on the square-algebraic identity $(V_1+V_2)^2-(V_1-V_2)^2=4V_1V_2$ and using the above-mentioned square law of MOS transistors. The multiplier includes circuits for squaring the sum and the difference of two differential input signals. Each squaring circuit comprises two MOS transistors acting as source followers, two so-called squaring transistors and a load, such as a resistor. However, the squaring circuits in this document require that the aspect ratio of the source followers be much larger than the aspect ratio of the squaring transistors, and that the drain current of the squaring transistors be less than a bias current flowing through the squaring transistors and the source followers, so that the gate-to-source voltage drop of the source followers can be regarded as constant. The constant gate-to-source voltage drop is necessary to obtain the required squaring of the sum and the difference, respectively, of the input signals. Moreover, it is difficult to provide MOS transistors that fulfill the condition regarding their aspect ratio mentioned above.

The document "A Four-Quadrant CMOS Analog Multiplier for Analog Neural Networks," by N. Saxena and J. J. Clark, published in IEEE Journal of Solid-State Circuits, Vol. 29, No. 6, June 1994 describes a four-quadrant analog multiplier with 5 n-MOS field effect transistors and two current mirrors. The operation of the four-quadrant multiplier is based on the algebraic identity $(V_1+V_2)^2-V_1^2-V_2^2=2V_1V_2$ and provides an output current $I_{out}=-2K\ V_{in1}\ V_{in2}$. The multiplier, however, does not provide a squared signal of the input signals, but instead creates respective drain currents in the transistors that are proportional to the square of the differences of the input voltages and the threshold voltages of the transistors. Since the MOS transistors are identical, summation of the individual drain currents eliminates the threshold voltages and produces an output voltage that is given by $I_{out}=-2K\ V_{in1}\ V_{in2}$.

The document "A CMOS Four-Quadrant Analog Multiplier with Single-Ended Voltage Output and Improved Temperature Performance," by Z. Wang, published in IEEE Journal of Solid-State Circuits, Vol. 26, No. 9, September 1991 discloses a multiplier consisting of a differential transconductor based on the square-difference technique, a scaled floating-voltage pair generator, an MOS resistor, and a bias generator. The MOS transconductor uses 2 cross-coupled pairs of MOS transistors operated in the saturation region. A floating bias voltage is applied between the gates of a respective pair of transistors. The circuit provides an output current that is proportional to the input voltage times the bias voltage, rather than an output current that is proportional to the square of the input signal.

Since producing the square of an input signal is required for a plurality of electronic devices and methods, such as measuring the root mean square value of any type of signal, there exists a need for an improved square multiplier providing fast signal performance while exhibiting low power consumption.

SUMMARY OF THE INVENTION

According to one aspect of the present invention, a field effect transistor (FET) square multiplier for squaring an input signal is provided, comprising a first field effect transistor formed on a substrate and having a gate, a source, a drain and a channel, the gate of the first field effect transistor connected to receive a sum of the input signal and a reference signal. The FET square multiplier also comprises a second field effect transistor formed on the substrate and having a gate, a source, a drain and a channel, the gate of the second field effect transistor connected to receive a difference of the input signal and the reference signal, wherein the first and second field effect transistors have a first aspect ratio of channel width to channel length, a first gate insulation layer capacitance per unit area and a first charge carrier mobility. The FET square multiplier also comprises a third field effect transistor formed on the substrate and having a gate, a source, a drain and a channel, the gate of the third field effect transistor connected to receive the reference signal, the third field effect transistor having a second aspect ratio of channel width to channel length, a second gate insulation layer capacitance per unit area and a second charge carrier mobility. Additionally, the FET square multiplier comprises a constant current source connected to the source of the first, second and third field effect transistors, respectively; wherein the drain of the first field effect transistor is connected to the drain of the second field effect transistor, and a parameter value defined as the product of aspect ratio, gate insulation layer capacitance per unit area and charge carrier mobility of the third field effect transistor is two times the corresponding parameter value of the first and second field effect transistors, wherein the field effect transistor square multiplier is adapted to provide a current $I_1$ at a common node connected to the drain of the first and second field effect transistors and a current $I_2$ at the drain of the third field effect transistor, wherein a difference of $I_1$ and $I_2$ is proportional to the square of the input signal when the first, second and third field effect transistors are operated in the saturation region.

According to another aspect of the present invention, an analog signal processing unit is provided, the analog signal processing unit comprising a plurality of square multipliers cooperatively connected to form an output signal in response to at least one input signal, the output signal representing a predefined function of the at least one input signal. In the analog signal processing unit each of the square multipliers includes a first field effect transistor formed on a substrate and having a gate, a source, a drain and a channel, the gate of the first field effect transistor connected to receive a sum of the at least one input signal and a reference signal. Each of the square multipliers also comprises a second field effect transistor formed on the substrate and having a gate, a source, a drain and a channel, the gate of the second field effect transistor connected to receive a difference of the at least one input signal and the reference signal, wherein the first and second field effect transistors have a first aspect ratio of channel width to channel length, a first gate insulation layer capacitance per unit area and a first charge carrier mobility. Each of the square multipliers further comprises a third field effect transistor formed on the substrate and having a gate, a source, a drain and a channel, the gate of the third field effect transistor connected to receive the reference signal, the third field effect transistor having a second aspect ratio of channel width to channel length, a second gate insulation layer capacitance per unit area and a second charge carrier mobility. Additionally, each of the square multipliers comprises a constant current source connected to the source of the first, second and third field effect transistors, respectively, wherein the drain of the first field effect transistor is connected to the drain of the second field effect transistor, and a parameter value defined as the product of aspect ratio, gate insulation layer capacitance per unit area and charge carrier mobility of the third field effect transistor is two times the corresponding parameter value of the first and second field effect transistors, each of the field effect transistor square multipliers adapted to provide a current $I_1$ at a common node connected to the drain of the first and second field effect transistors and a current $I_2$ at the drain of the third field effect transistor element, wherein a difference of $I_1$ and $I_2$ is proportional to the square of the at least one input signal. The analog signal processing unit further comprises a common current mirror connected to each of the plurality of square multipliers to form an output current representing the output signal.

According to a further aspect of the present invention, a method for squaring an input signal with a plurality of field effect transistors is provided, the method comprising providing a first field effect transistor having a gate, a source, a drain and a channel, the gate of the first field effect transistor connected to receive a sum of the input signal and a reference signal. The method also comprises providing a second field effect transistor having a gate, a source, a drain and a channel, the gate of the second field effect transistor connected to receive a difference of the input signal and the reference signal, wherein the first and second field effect transistors having a first aspect ratio of channel width to channel length, a first gate insulation layer capacitance per unit area and a first charge carrier mobility. The method further comprises providing a third field effect transistor having a gate, a source, a drain and a channel, the gate of the third field effect transistor connected to receive the reference signal, the third field effect transistor having a second aspect ratio of channel width to channel length, a second gate insulation layer capacitance per unit area and a second charge carrier mobility. Furthermore, the method comprises providing a constant current source connected to the source of the first, second and third field effect transistors, respectively, wherein the drain of the first field effect transistor is connected to the drain of the second field effect transistor, and a parameter value defined as the product of aspect ratio, gate insulation layer capacitance per unit area and charge carrier mobility of the third field effect transistor is two times the corresponding parameter value of the first and second field effect transistors. Additionally, the method comprises connecting the drains of the first and second field effect transistors to a first voltage and connecting the drain of the third field effect transistor to a second voltage, and initiating a current I through the constant current source to maintain the first, second and third field effect transistors, respectively, in the saturation region, wherein a difference of a current $I_1$ at a common node connected to the drain of the first and second field effect transistors and a current $I_2$ through the third field effect transistor is proportional to the square of the input signal.

The present invention allows the formation of a square multiplier with a minimum number of field effect transistors formed on a common substrate. Accordingly, a fast and power-saving device can be made, requiring a minimum chip area so that these square multipliers can easily be implemented in a variety of signal processing circuits even if a large number of multipliers is necessary. The field effect transistors of the multiplier are formed such that one of the transistors exhibits a transconductance value that is twice the transconductance value of each of the other two transistors. Therefore, the transistors may easily be formed in a common manufacturing process wherein, for example, the transistor channel width of one transistor is selected as twice the width of the other two transistors. The corresponding processes for defining the dimensions of the channel width are well-controllable in the manufacturing process, such as an MOS process, and, hence, the required width-to-width relationship of the first and second field effect transistors with the third field effect transistor can be obtained with high precision, wherein a high degree of uniformity of the remaining parameters of the transistors, such as gate capacitance per unit area and charge carrier mobility is insured. Similarly, and/or alternatively, the channel length may accordingly be adapted to provide the required double-size aspect ratio. Furthermore, in some cases it may be advantageous to change the gate capacitance per unit area of the transistors and/or the charge carrier mobility to obtain the required transconductance relationship for proper operation of the present square multiplier. Preferably, the aspect ratios of the first, second and third transistors, however, are adapted to meet the requirement of a doubled transconductance value of the third transistor.

In a further embodiment of the present invention, substantially identical field effect transistors are provided on a common substrate wherein two or more transistors are cooperatively operated so as to form one or more of each of the first, second and third field effect transistors having the required transconductance relationship. This may be accomplished in that two or more transistors may be electrically connected in series and/or in parallel to form any or all of the first and/or the second and/or the third field effect transistors.

Moreover, a square multiplier according to the present invention may comprise a current mirror, which may be formed of two transistor elements to provide an output stage for outputting the difference of the currents $I_1$ and $I_2$, representing the square of the input signal, wherein the output current signal allows a simple addition of output signals of a plurality of square multipliers. Moreover, two or more square multipliers may be connected together to form a functional unit that outputs a predefined function of one or more input signals when creation of the defined output function necessitates a plurality of squaring operations. The functional unit may further comprise a plurality of current mirrors, or, alternatively, a single common current mirror connected to each of the two or more square multipliers to provide a combined current signal representing the required output function.

BRIEF DESCRIPTION OF THE DRAWINGS

Further advantages and objects of the present invention are defined in the appended claims and will become more apparent with the following detailed description when taken with reference to the accompanying drawings in which:

DETAILED DESCRIPTION OF THE INVENTION

Figure 1:
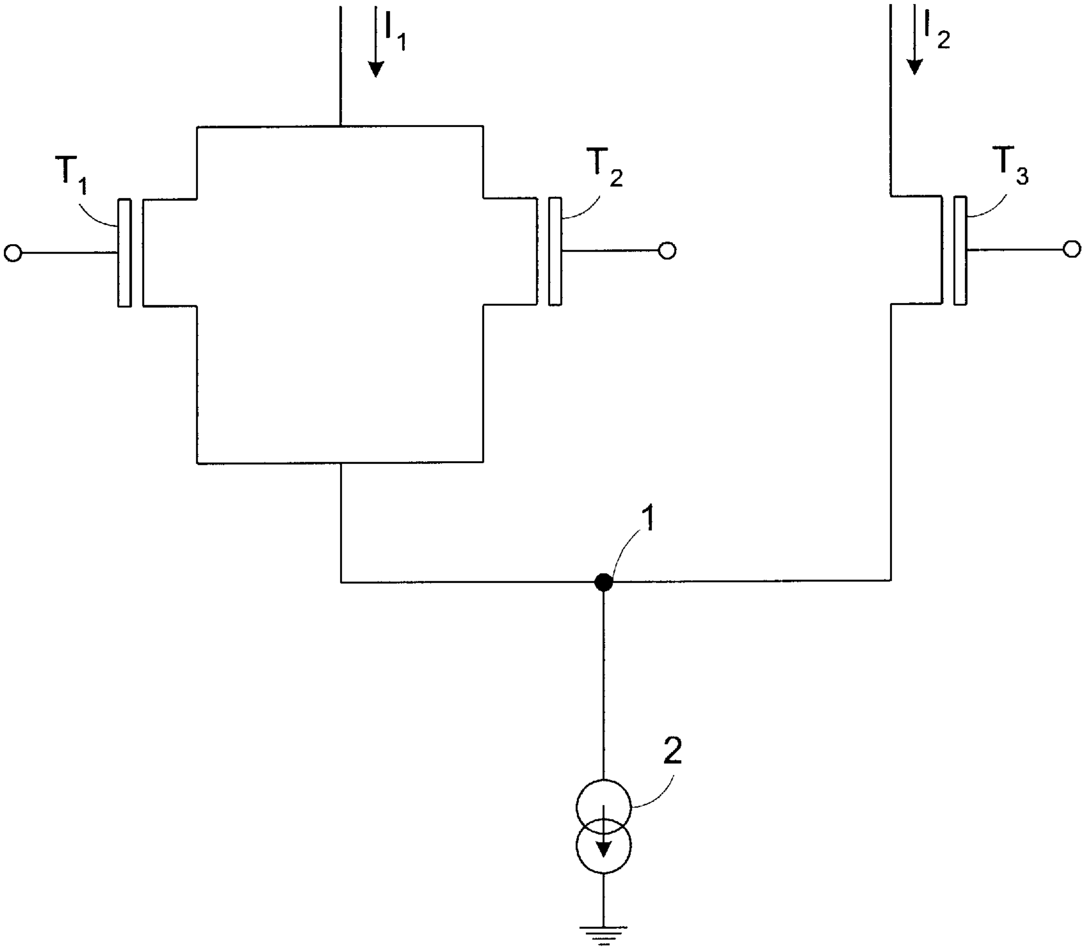
FIG. 1 is a circuit diagram of the basic arrangement of a square multiplier according to one embodiment of the present invention.

While the present invention is described with reference to the embodiments as illustrated in the following detailed description as well as in the drawings, it should be understood that the following detailed description as well as the drawings are not intended to limit the present invention to the particular illustrative embodiments disclosed, but rather the described illustrative embodiments merely exemplify the various aspects of the present invention, the scope of which is defined by the appended claims.

FIG. 1 is a circuit diagram illustrating an example for explaining the basic arrangement of the square multiplier according to one embodiment of the present invention. In FIG. 1 a first n-channel field effect transistor (FBT) $T_1$ having a drain, a source and a gate is electrically connected with its source to the source of a second n-channel FET $T_2$, the drain of which is connected to the drain of $T_1$. A third FET $T_3$ having a drain, a source and a gate is electrically connected with its source to a common node 1. The sources of $T_1$ and $T_2$, respectively, are also connected to common node 1. A constant current source 2 is connected with one terminal to the common node 1 and with the other terminal to a first reference potential, such as ground potential or the negative supply voltage, or, alternatively, the positive supply voltage as the first reference voltage when $T_1$, $T_2$, and $T_3$ are p-channel transistors.

In operation, transistor $T_1$ receives at its gate a signal that is the sum of an input signal ΔU that is to be squared and a second reference voltage Ucm. Transistor $T_2$ receives at its gate a signal that is the difference of ΔU and Ucm. It is to be noted that either the second reference voltage may be created by any appropriate constant voltage source, or the common mode voltage of a fully differential system may be used as the second reference voltage Ucm. A voltage divider may also be used to produce the second reference voltage Ucm. The second reference voltage Ucm is applied to the gate of $T_3$. As previously mentioned, FETs $T_1$, $T_2$, and $T_3$ are operated in the saturation region where $U_{DS}>U_{GS}-U_{Th}$, with $U_{DS}$, $U_{GS}$, and $U_{Th}$ as the drain-source voltage, the gate-source voltage and the gate threshold voltage, respectively. Under these conditions, the current through $T_3$, referred to as $I_2$, is given by:

$$I_2=K_3\ (U_{GS3}-U_{Th3})^2=K_3\ (Ucm-U_x-U_{Th3})^2;$$

where $U_x$ is the voltage at the common node 1 and $K_3$ is the transconductance value of $T_3$. For the sake of clarity, the term $(Ucm-U_x-U_{Th3})$ will be referred to as a voltage $U_z$.

Similarly, a current $I_1$ through $T_1$ and $T_2$ is given by the sum of the individual currents $I_{11}$ and $I_{12}$ through FETs $T_1$ and $T_2$, respectively, wherein $$I_{11}=K_1\ (Ucm-U_x-U_{Th1}+\Delta U)^2, \text{ and}$$

$$I_{12}=K_2\ (Ucm-U_x-U_{Th2}-\Delta U)^2.$$

$K_1$ and $K_2$ are the transconductance values of FETs $T_1$ and $T_2$, respectively, where $K_{1/2}=\frac{1}{2}\mu_0 C_{OX}$ W/L of the respective FET, as previously described. If the transconductance values of $T_1$ and $T_2$ are selected to be equal to each other, and the threshold voltages $U_{th}$ of $T_1$, $T_2$, and $T_3$ are equal to each other, then current $I_1$ is given by:

$$I_1=K\ [(U_z+\Delta U)^2+(U_z-\Delta U)^2];\ K=K_1=K_2, \text{ and thus:}$$

$$I_1=2K\ (U_z^2+\Delta U^2).$$

If one considers the difference of the currents $I_1$ and $I_2$, $$I_2-I_1=K_3U_z^2-2KU_z^2-2K\ \Delta U^2$$

the undesired term $U_z$ can be eliminated when $K_3$ is set to: $K_3=2K$. Thus, $\Delta I=I_2-I_1=-2K\ \Delta U^2$ is proportional to the square of the input voltage ΔU.

In conformity with the above description, the transistors are manufactured in such a way that the threshold voltages are substantially identical and the transconductance values K of FETs $T_1$ and $T_2$ coincide, whereas the K value of FET $T_3$ is twice the value of either $T_1$ or $T_2$. A substantially identical threshold voltage can be obtained, for example, by a common source terminal that avoids the occurrence of changes in the threshold voltages due to a different voltage between the source and the substrate of the respective transistor. Thus, transistors having a common source terminal experience a so-called "common body effect." This can easily be accomplished, for example, by manufacturing the FETs in a common manufacturing process, such as a CMOS process or the like, wherein, for instance, the channel width of $T_3$ is selected to be equal to two times the channel width of FET $T_1$. Accordingly sized transistors can be obtained by a corresponding design of the transistor dimensions. Similarly, and/or alternatively, the channel length of $T_3$ may be formed to be half the length of $T_1$ and $T_2$. Preferably, a plurality of substantially identical transistor devices are formed on a common substrate, such as a semiconductor substrate like silicon, germanium, or any type of compound semiconductors, or such as an insulating substrate, for instance in an SOI (silicon-on-insulator) device. $T_3$ is then formed by using two individual transistor devices and electrically connecting them in parallel to obtain the doubled aspect ratio, while at the same time insuring an excellent conformity of the remaining parameters of the transistor devices, such as carrier mobility and gate capacitance per unit area.

It should be noted that the transistors $T_1$ and $T_2$ can also be formed of two or more single transistor devices. For instance, two transistor devices can be connected in series to halve the aspect ratio. Moreover, any of the transistors $T_1$, $T_2$ and $T_3$ can be formed as a combination of plural single transistor devices connected in series and/or in parallel so long as the aspect ratio fulfills the required relationship. Thus, parameters such as current capacity, overall gate capacitance per unit area, and the like, of the transistors $T_1$, $T_2$, and $T_3$ may be adjusted in conformity with design requirements.

Since carrier mobility and gate capacitance strongly depend on the manufacturing parameters, as the skilled person will readily appreciate, adjusting the transconductance value of $T_3$ to that of $T_1$ and $T_2$ by means of adjusting the aspect ratio is the preferred method. It is, however, possible to adjust carrier mobility and/or the gate capacitance and/or the aspect ratio so as to obtain the required K values for $T_1$, $T_2$, and $T_3$.

The constant current source 2 required for biasing the common node 1 may be formed by at least one transistor, which may advantageously be formed during the process of forming the FETs $T_1$, $T_2$, and $T_3$. Current source 2, however, need not be formed with a FET, but may include other devices as well, such as a resistor and/or a bipolar transistor. Furthermore, the present invention is not limited to FETs manufactured in a CMOS process, but is in conformity with any process for manufacturing FETs, such as NMOS processing, PMOS processing, processes using formation of FETs with any appropriate gate insulation layer, such as nitride layers, and the like.

Figure 2:
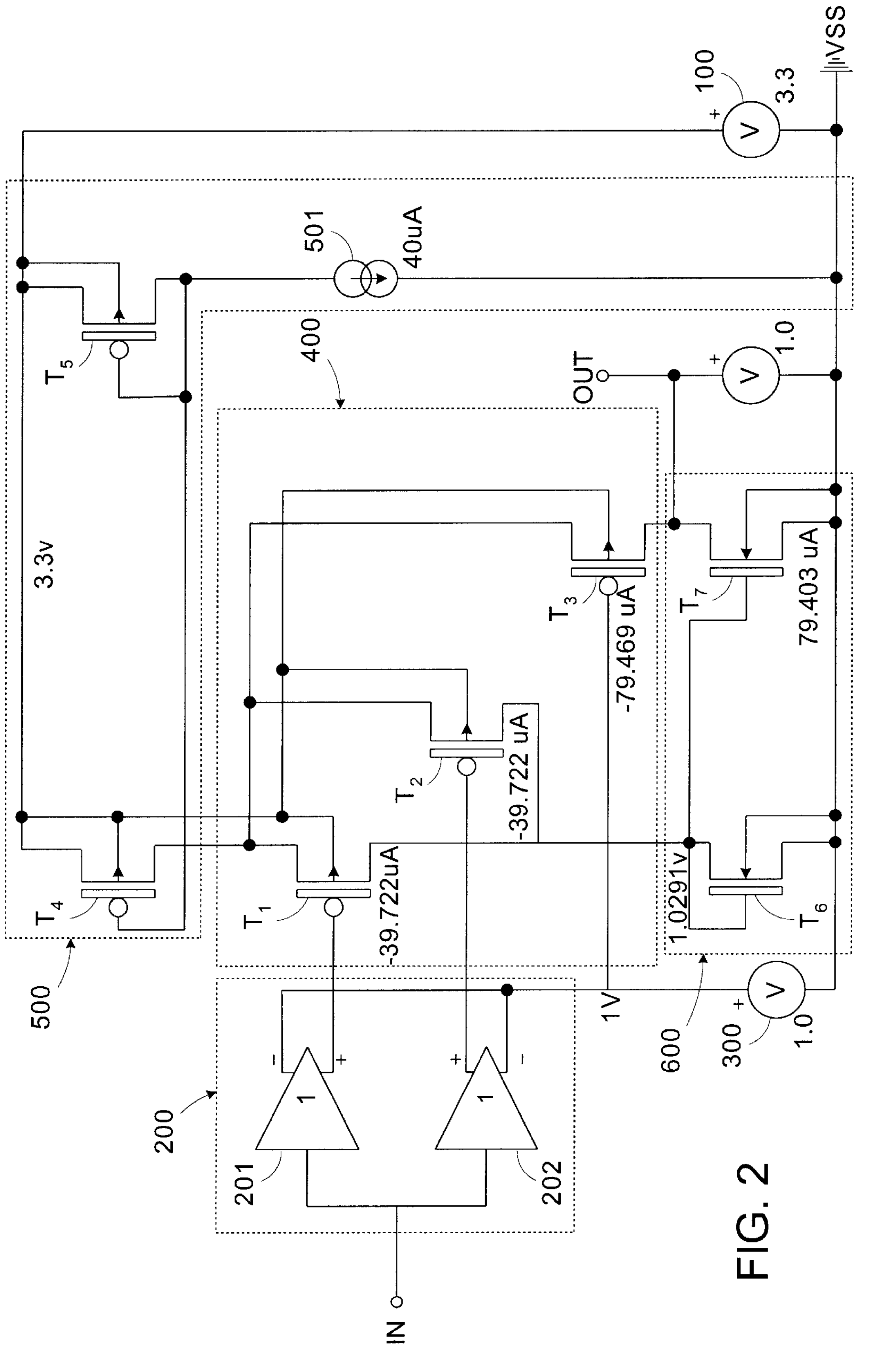
FIG. 2 is a circuit diagram of an example of a squaring circuit including the basic arrangement depicted in FIG. 1 and having input and output stages.

FIG. 2 is a circuit diagram of an embodiment of the present invention that includes a square multiplier 400 that is similar to that described with reference to FIG. 1, an input stage 200, an output stage 600, a constant current source 500, a reference voltage source 300 and a supply voltage source 100. The input stage 200 comprises a first input amplifier 201 having an input and an output for providing an output signal as the sum of the reference voltage supplied by the reference voltage source 300. Input stage 200 further comprises a second input amplifier 202 having an input and an output for providing the difference of the reference voltage and the input signal. Square multiplier 400 comprises p-channel MOSFETs $T_1$, $T_2$ and $T_3$, each having a gate, a drain, a source and a body terminal. As previously described with reference to FIG. 1, the sources of FETs are tied together, and the drains of $T_1$, and $T_2$ are connected to each other.

Constant current source 500 comprises p-channel MOSFETs $T_4$ and $T_5$ forming a first current mirror, and a current adjusting element 501, such as a further transistor, a resistor formed on the common substrate, an external resistor, or the like. Output stage 600 is formed by a second current mirror comprising n-channel MOSFETs $T_6$ and $T_7$. The body terminals of all p-channel transistors are connected to the positive terminal of the supply voltage source 100, and the body terminals of the n-channel transistors are connected to the negative terminal of the supply voltage source 100.

It should be noted that in an SOI circuit the source and the substrate of each transistor may individually be shorted. It is sufficient to provide a common source node and a common substrate node for all three transistors. The common source node and the common substrate node need not necessarily be connected to each other. For instance, the common substrate node may be connected to another voltage, such as the supply voltage.

In operation, an input signal is applied to the inputs of first and second input amplifiers 201, 202, respectively. First input amplifier 201 supplies the sum of the input signal and the reference voltage (in this example the reference voltage is adjusted to 1V) to the gate of $T_1$, and second input amplifier 202 provides the difference of the reference voltage and the input signal to the gate of $T_2$. The reference voltage is applied to the gate of $T_3$. Constant current source 500 supplies a constant current set to 40 $\mu$A by adjusting the current adjusting element 501 to the sources of $T_1$, $T_2$ and $T_3$. The difference of the currents flowing through $T_1$, $T_2$, on the one hand, and through $T_3$, on the other hand, depend on the input signal in the manner previously described with reference to FIG. 1, since the transconductance value of $T_3$ is twice of that of transistors $T_1$ and $T_2$. The current flowing through $T_1$ and $T_2$ determines the current through $T_6$ of the second current mirror in output stage 600. Accordingly, the current of $T_7$ is determined by the current of $T_6$, and the difference of the currents of $T_1$, $T_2$, and $T_3$ with reference to the reference voltage is available as an output signal at the drain terminal of $T_7$, wherein the output signal is proportional to the square of the input signal. In this example a supply voltage of 3.3V is applied and the transistors are designed such that the voltage and current-values indicated in FIG. 2 are obtained. With this configuration the transistors $T_1$, $T_2$, and $T_3$, respectively, are operated in the saturation region for input voltages up to 0.7V. The current-value of 66.295 nA of the output signal relates to an input signal of 0V with respect to the reference voltage of 1V, and, hence, represents the "middle position" of the squaring multiplier. The output current of 66.295 nA relating to an input signal of 0V in this example is caused by the output resistance of the MOSFETs, since different drain voltages are caused by the presence of the current mirror and the reference voltage of 1V. An appropriate additional circuitry, such as a Kaskode-stage, may significantly reduce the output current for the 0V input signal. Moreover, it should be noted that the embodiment illustrated in FIG. 2 is an example for explaining the present invention, and the person skilled in the art, however, will readily appreciate that any other configuration for example, a different supply voltage and/or a different reference voltage and/or a different transistor design may be employed as long as $T_1$, $T_2$ and $T_3$ are operated in the saturation region. Moreover, the first and second input amplifiers 201 and 202 are illustrated to have a gain factor of 1, but any other value may be chosen, if required, to obtain a desired output signal.

In a further variation of the present invention, two or more square multipliers may be combined to produce, as an output signal, a predefined function of one or more input signals applied to one or more of the square multipliers. In this configuration, a common output stage, such as a current mirror similar to current mirror $T_6$ and $T_7$, may be provided for the two or more square multipliers to obtain the desired output signal, rather than providing a respective output stage for each square multiplier.

As previously described, since the signal performance of the square multiplier depends on the transistor characteristics, such as gate threshold voltage, carrier mobility, gate capacitance per unit area and aspect ratio of the channel, the FETs forming the squaring multiplier are preferably manufactured on a common substrate wherein all of the FETs are subjected to substantially the same manufacturing processes. Thus, advantageously the aspect ratio of the FETs is adjusted by providing identical transistor elements wherein two transistor elements are combined to form a double-size transistor. Furthermore, additional circuitry, such as input stages and output stages may be formed on the same substrate so that a fast and efficient circuit can be provided, requiring a minimum of chip area. The present invention, however, is also applicable to a system in which the square multiplier including at least 3 FETs for realizing the above-deduced algebraic identity is connected to an external device that may comprise, for example, input and output stages, a current source, and the like.

The principle of the present invention may also be used in a method for squaring an input signal by means of individual FET devices that are selected and coupled so as to meet the above relationship between the transconductance values of the FETs. Since a certain amount of variation of transistor characteristics between individual transistor devices will occur, this method is limited to uncritical applications which do not require a high degree of precision, but feature the advantages of FETs over bipolar devices, such as minimum power consumption, ease of manufacture, and the like.

Further modifications and alternative embodiments of various aspects of the invention will be apparent to those skilled in the art in view of this description. Accordingly, this description is to be construed as illustrative only, and is for the purpose of teaching those skilled in the art the general manner of carrying out the present invention. It is to be understood that the forms of the invention shown and described herein are to be taken as the presently preferred embodiments. Elements and materials may be substituted for those illustrated and described herein.

What is claimed is:

1. A field effect transistor square multiplier for squaring an input signal, the field effect transistor square multiplier comprising:

an input stage for providing a sum of the input signal and a reference signal and a difference of the reference signal and the input signal;

a first field effect transistor device formed on a substrate and having a gate, a source, a drain and a channel, the gate of the first field effect transistor device connected to receive the sum of the input signal and of the reference signal;

a second field effect transistor device formed on the substrate and having a gate, a source, a drain and a channel, the gate of the second field effect transistor device connected to receive the difference of the reference signal and of the input signal, the first and second field effect transistor devices having a first aspect ratio of channel width to channel length, a first gate insulation layer capacitance per unit area and a first charge carrier mobility;

a third field effect transistor device formed on the substrate and having a gate, a source, a drain and a channel, the gate of the third field effect transistor device connected to receive the reference signal, the third field effect transistor device having a second aspect ratio of channel width to channel length, a second gate insulation layer capacitance per unit area and a second charge carrier mobility; and a constant current source connected to the source of the first, second and third field effect transistor devices respectively;

wherein the drain of the first field effect transistor device is connected to the drain of the second field effect transistor device, and a parameter value defined as the product of aspect ratio, gate insulation layer capacitance and charge carrier mobility of the third field effect transistor device is two times the corresponding parameter value of the first and second field effect transistor devices, the field effect transistor square multiplier adapted to provide a current $I_1$ at a common node connected to the drain of the first and second field effect transistor and a current $I_2$ at the drain of the third field effect transistor, wherein a difference of $I_1$ and $I_2$ is proportional to the square of the input signal.

2. The field effect transistor square multiplier of claim 1, further comprising a current mirror connected to receive the current $I_1$ and the current $I_2$ and having an output connected to the reference voltage, the current mirror forming an output current representing the difference of the currents $I_1$ and $I_2$.

3. The field effect transistor square multiplier of claim 2, wherein the current mirror is formed by two or more field effect transistors formed on the substrate.

4. The field effect transistor square multiplier of claim 1, wherein the third field effect transistor device is comprised of two or more single transistor elements formed on the substrate.

5. The field effect transistor square multiplier of claim 1, wherein the first and the second field effect transistor devices, respectively, are composed of two or more single transistor elements formed on the substrate.

6. The field effect transistor square multiplier of claim 4, wherein the first and second field effect transistors and the third field effect transistor have substantially identical gate threshold voltages due to substantially the same manufacturing process.

7. The field effect transistor square multiplier of claim 1, wherein the aspect ratio of the third field effect transistor device is twice the aspect ratio of the first and second field effect transistor devices.

8. The field effect transistor square multiplier of claim 1, wherein said reference signal is provided by a voltage divider.

9. The field effect transistor square multiplier of claim 1, wherein the first and second field effect transistor devices and the third field effect transistor device are p-channel transistors.

10. The field effect transistor square multiplier of claim 1, wherein the first and second field effect transistor devices and the third field effect transistor device are n-channel transistors.

11. The field effect transistor square multiplier of claim 1, wherein the substrate is a semiconductor substrate.

12. The field effect transistor square multiplier of claim 1, wherein the substrate is an insulating substrate.

13. The field effect transistor square multiplier of claim 1, wherein the first and second field effect transistor devices and the third field effect transistor device are MOS transistors.

14. The field effect transistor square multiplier of claim 1, wherein the constant current source is formed on the substrate.

15. The field effect transistor square multiplier of claim 14, wherein the constant current source comprises at least one of a transistor device and a resistor.

16. A method of squaring an input signal with field effect transistors, the method comprising:

providing a first field effect transistor;

providing a first signal comprising a sum of the input signal and a reference signal to a gate of the first field effect transistor;

providing a second field effect transistor;

providing a second signal comprising a difference of the reference signal and the input signal to a gate of the second field effect transistor, the first and second field effect transistors having a first aspect ratio of a channel width to a channel length, a first gate insulation layer capacitance per unit area and a first charge carrier mobility;

providing a third field effect transistor;

providing the reference signal to a gate of the third field effect transistor, the third field effect transistor having a second aspect ratio of a channel width to a channel length, a second gate insulation layer capacitance per unit area and a second charge carrier mobility;

providing a constant current source connected to a source of the first, second and third field effect transistors, respectively, wherein a drain of the first field effect transistor is connected to a drain of the second field effect transistor, and a parameter value defined as the product of aspect ratio, gate insulation layer capacitance per unit area and charge carrier mobility for the third field effect transistor is two times the corresponding parameter value of the first and second field effect transistors;

connecting the drains of the first and second field effect transistors to a first voltage;

connecting the drain of the third field effect transistor to a second voltage; and initiating a current I through the constant current source so as to maintain the first and second field effect transistors and the third field effect transistor, respectively, in the saturation region, wherein a difference of the currents through the first and second field effect transistors is proportional to the square of the input signal.

* * * * *